United States Patent
Iwaki et al.

(10) Patent No.: US 6,247,848 B1
(45) Date of Patent: Jun. 19, 2001

(54) HYDRAULIC DYNAMIC BEARING AND SPINDLE MOTOR UTILIZING HYDRAULIC DYNAMIC BEARING

(75) Inventors: Tadao Iwaki; Shigeru Ohki; Naoki Kawawada; Atsushi Ohta; Koji Nitadori; Isamu Takehara; Hiromitsu Goto; Takafumi Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/535,377

(22) Filed: Mar. 24, 2000

(30) Foreign Application Priority Data

Mar. 26, 1999 (JP) .................................................. 11-084292

(51) Int. Cl.[7] ...................................................... F16C 17/10
(52) U.S. Cl. .............................. 384/107; 310/90; 384/112
(58) Field of Search ..................................... 384/111, 112, 384/107, 100, 113; 30/67 R, 90; 310/90

(56) References Cited

U.S. PATENT DOCUMENTS

| | | | |
|---|---|---|---|
| 5,658,080 | * 8/1997 | Ichiyama | 384/112 |
| 5,988,886 | * 11/1999 | Takahashi | 384/107 |
| 6,036,368 | * 3/2000 | Takahara et al. | 384/112 |
| 6,176,618 | * 1/2001 | Kawawada et al. | 384/107 |

* cited by examiner

Primary Examiner—Burton Mullins
(74) Attorney, Agent, or Firm—Adams & Wilks

(57) ABSTRACT

A hydraulic dynamic bearing has a rotational assembly and a bearing member for rotationally supporting the rotational assembly. The bearing member has a main body having a recess portion and a cover for covering an open end of the recess portion. The rotational assembly has a shaft main body having an end portion extending into the recess of the bearing main body for undergoing rotation relative thereto and a ring member disposed in the recess of the bearing main body. The ring member is connected to the end portion of the shaft main body for rotation therewith. Axial dynamic pressure generating grooves are formed in upper and lower surface portions of the ring member for generating axial dynamic pressure during rotation of the rotational assembly. Radial dynamic pressure generating grooves are formed in an outer peripheral surface portion of the ring member for generating radial dynamic pressure during rotation of the rotational assembly. Spaces are formed between the bearing member and the rotational assembly for storing a lubricant.

25 Claims, 5 Drawing Sheets

HYDRAULIC DYNAMIC BEARING AND SPINDLE MOTOR UTILIZING HYDRAULIC DYNAMIC BEARING

BACKGROUND OF THE INVENTION

The present invention relates to a ring-like hydraulic dynamic bearing having axial dynamic pressure portions and a radial dynamic pressure portion contiguous to each other and to a spindle motor using the hydraulic dynamic bearing.

As a bearing for a spindle motor for a hard disk device, there is used a hydraulic dynamic bearing having a shaft portion and a bearing portion for supporting the bearing portion. The hydraulic dynamic bearing is formed with dynamic pressure generating grooves at either one of opposed faces of the shaft and bearing portions and is formed with a layer of a lubricant at high pressure in a very small clearance disposed between the shaft and bearing portions so that during rotation of the shaft portion noncontact rotation of the shaft portion is realized.

FIG. 8 is a sectional view showing a conventional ring-like hydraulic dynamic bearing. A ring-like hydraulic dynamic bearing 100 is provided with a shaft portion 103 constituted by fixing a ring 102 to an end portion 101A of a shaft main body 101 by press fitting and a bearing portion 104 supporting the shaft portion 103 and is constituted such that the ring 102 at the shaft portion 103 rotatably contained in a recess portion 105A of a main body 105 of the bearing portion 104 is prevented from coming out from the recess portion 105A by a circular disk-like thrust holding member 106.

An upper face 102A and a lower face 102B of the ring 102 are respectively formed with axial dynamic pressure generating grooves G1 and G2 and a peripheral face 102C of the ring 102 is formed with radial dynamic pressure generating grooves G3.

A lubricant for generating dynamic pressure is held between the shaft portion 103 and the bearing portion 104 and accordingly, when the shaft portion 103 is rotated, axial dynamic pressure is generated between the upper face 102A and the circular disk-like thrust holding member 106 by the axial dynamic pressure generating grooves G1 and axial dynamic pressure is generated between the lower face 102B and a bottom face of the recess portion 105A by the axial dynamic pressure generating grooves G2. Further, radial dynamic pressure is generated between the peripheral face 102C and an inner peripheral face of the recess portion 105A by the radial dynamic pressure generating grooves G3. As a result, axial dynamic pressure bearings and a radial dynamic pressure bearing which are lubricant layers at high pressure are formed between the shaft portion 103 and the bearing portion 104 to thereby enable to rotate the shaft portion 103 by noncontact rotation.

As described above, according to the conventional ring-like radial dynamic bearing, there is constructed the constitution in which the radial dynamic pressure generating face and the axial dynamic pressure generating faces are contiguous to each other and accordingly, the following problem is posed. That is, when the shaft portion 103 is rotated, by the axial dynamic pressure generating grooves G1, the axial dynamic pressure generating grooves G2 and the radial dynamic pressure generating grooves G3 which are respectively formed at the upper face 102A, the lower face 102B and the peripheral face 102C of the ring 102, the lubricant is drawn to central portions of the respective dynamic pressure generating faces and negative pressure is produced at portions of the upper face 102A and the peripheral face 102C contiguous to each other and portions of the lower face 102B and the peripheral face 102C contiguous to each other. As a result of producing the negative pressure caused by mutual interference, air bubbles are liable to produce at the portions of the dynamic pressure generating faces contiguous to each other which hamper flow of the lubricant and accordingly, there causes a drawback in which sufficient dynamic pressure is not generated and the bearing rigidity is deteriorated.

SUMMARY OF THE INVENTION

Hence, it is an object of the invention to provide a hydraulic dynamic bearing capable of resolving the above-described problem in the conventional technology and to a spindle motor using the hydraulic dynamic bearing.

In order to resolve the above-described problem, according to an aspect of the invention, there is proposed a hydraulic dynamic bearing which is a ring-like hydraulic dynamic bearing comprising a shaft portion constituted by fixing a ring to an end portion of a shaft main body thereof and a bearing portion supporting the shaft portion via the ring wherein a radial dynamic pressure bearing portion and axial dynamic pressure bearing portions are formed contiguously to each other between the ring and the bearing portion and wherein spaces for storing a lubricant for generating dynamic pressure are provided along portions of the radial dynamic pressure bearing portion and the axial dynamic pressure bearing portions contiguous to each other.

When relative rotational motion is caused between the shaft portion and the bearing portion, the lubricant at the respective dynamic pressure bearing portions is drawn to respective central portions of the shaft and bearing portions to thereby generate required dynamic pressure. Therefore, at regions of the radial dynamic pressure bearing portion and the axial dynamic pressure bearing portions contiguous to each other, the lubricant is going to reduce. However, owing to the lubricant stored in the spaces provided along the portions of the two dynamic pressure bearing portions contiguous to each other, the reduction does not amount to produce mutual interference between the two dynamic pressure bearing portions and mutual operation between the two dynamic pressure bearing portions is alleviated. As a result, at the portions of the two dynamic pressure bearing portions contiguous to each other, generation of negative pressure is restrained and air bubbles can be restrained from generating in the lubricant and accordingly, the bearing rigidity can be made higher than that in the conventional bearing.

The radial dynamic pressure bearing can be formed by providing dynamic pressure generating grooves at an outer peripheral face of the ring or an inner face of the bearing portion opposed thereto. The axial dynamic pressure bearing can be formed by providing the dynamic pressure generating grooves at at least one of plane portions contiguous to an outer peripheral face of the ring. Alternatively, the dynamic pressure generating grooves may be formed at inner faces of the bearing portion opposed to the plane portions.

The spaces for storing the lubricant can be provided by forming ring-like recess portions at boundary regions between the outer peripheral face of the ring and the planes contiguous thereto. A sectional shape of the recess portion may be that of a circular arc or an arbitrary stepped shape of an L-like type.

According to another aspect of the invention, there is proposed a constitution in which a clearance is provided between an end face of the shaft main body and the bearing portion opposed thereto and paths for communicating the clearance with the atmosphere are formed at an inner peripheral face of the ring to thereby enable to circulate the lubricant by the clearance and the paths.

According to the constitution, in the case in which there is constructed a constitution in which axial dynamic pressure is generated between the plane portion on the end face side of the shaft main body in the plane portion of the ring and the bearing portion, even when the lubricant disposed in the clearance is drawn to the ring side in generating the dynamic pressure, owing to the lubricant circulating to the clearance by passing through the paths communicating with the atmosphere, the negative pressure can effectively be prevented from generating in the clearance. As a result, the dynamic pressure is excellently generated at the plane portion and the bearing rigidity can further be promoted.

Further, in either of the cases, the spaces for storing the lubricant are not limited to the constitution provided by machining the ring but in place thereof or in addition thereto, for example, there may be constructed a constitution in which the spaces are provided by forming ring-like grooves at corresponding portions of the bearing portion.

DETAILED DESCRIPTION OF THE PREFERRED EMBODIMENTS

A detailed explanation will be given of an examples of embodiments according to the invention in reference to the drawings as follows.

Figure 1:
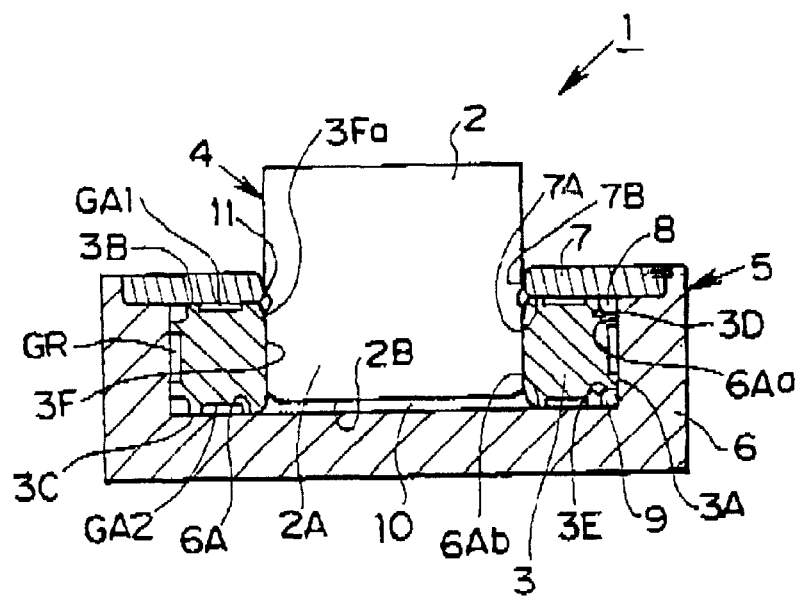
FIG. 1 is a sectional view showing an example of an embodiment of a ring-like hydraulic dynamic bearing according to the invention.

FIG. 1 is a sectional view showing an example of an embodiment of a ring-like hydraulic dynamic bearing according to the invention. The ring-like hydraulic dynamic bearing 1 is provided with a shaft assembly portion 4 constituted by fixing a ring 3 to an end portion 2A of a shaft main body 2 by press fitting and a bearing assembly portion 5 supporting the shaft portion 4. The bearing portion 5 comprises a bearing portion main body 6 and a circular disk-like thrust holding member 7 and is constructed by a constitution in which the ring 3 of the shaft portion 4 rotatably contained in a recess portion 6A of the bearing portion main body 6 is held by the thrust holding member 7 which functions as a cover to thereby prevent the ring 3 from coming out from the recess portion 6A. Further, a lubricant is held between the bearing portion 5 and the bearing portion main body 6.

Figure 2:
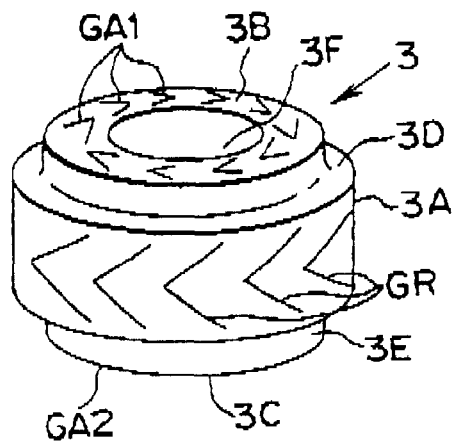
FIG. 2 is a perspective view enlarging a ring shown in FIG. 1.

FIG. 2 shows an enlarged view of the ring 3. An outer peripheral face 3A of the ring 3 is formed with radial dynamic pressure generating grooves GR and axial dynamic pressure grooves GA1 are formed at a plane portion 3B contiguous to the outer peripheral face 3A of the ring 3. Axial dynamic pressure generating grooves GA2 are similarly formed at a plane portion 3C on a side opposed to the plane portion 3B although not apparent in FIG. 2 (refer to FIG. 1). Both of the radial hydraulic pressure generating grooves GR and the axial dynamic pressure generating grooves GA1 and GA2 can be formed by a publicly-known method.

The ring 3 is formed as described above and accordingly, as shown by FIG. 1, when the ring 3 is rotated in the bearing portion 5 constituted by the bearing portion main body 6 and the thrust holding member 7, a radial dynamic pressure portion is formed by the outer peripheral face 3A and an inner peripheral face 6Aa of the recess portion 6A opposed thereto. Simultaneously therewith, an axial dynamic pressure portion is formed by the plane portion 3B and a bottom face 7A of the thrust holding member 7 opposed thereto and an axial dynamic pressure portion is formed by the plane portion 3C and a bottom face 6Ab of the recess portion 6A opposed thereto.

The radial dynamic portion and the axial dynamic portions formed between the shaft portion 4 and the bearing portion 5 as described above, are contiguous to each other and accordingly, the radial dynamic pressure portion and the axial dynamic pressure portions are provided with a tendency of interfering with each other as has been explained already.

In order to improve the drawback of the mutual interference, there are provided ring-like stepped portions 3D and 3E at portions constituting boundaries between the radial dynamic pressure portion and the axial dynamic pressure portions. The ring-like stepped portion 3D is a stepped portion having a section in an L-like shape and the outer peripheral face 3A and the plane portion 3B are separated by the ring-like stepped portion 3D. Further, when the shaft portion 4 and the bearing portion 5 are integrated, the ring-like stepped portion 3D forms a ring-like space 8 and is used for storing the lubricant for generating dynamic pressure in the ring-like space 8 (refer to FIG. 1).

Meanwhile, the ring-like stepped portion 3E is similarly constituted by a stepped portion having a section in an L-like shape and the outer peripheral face 3A and the plane portion 3C are separated by the ring-like stepped portion 3E. Further, when the shaft portion 4 and the bearing portion 5 are integrated, the ring-like stepped portion 3E forms a ring-like space 9 and is used for storing the lubricant for generating dynamic pressure in the ring-like space 9 (refer to FIG. 1).

Further, as shown by FIG. 1, a very small space 10 is formed between a lower end face 2B of the shaft main body 2 and the bottom face 6Ab of the recess portion 6 and the lubricant is filled also in the very small space 10. Meanwhile, a ring-like oil storage space 11 is provided at an upper end edge 3Fa of an inner peripheral face 3F of the ring 3. The oil storage space 11 communicates with the atmosphere via a clearance between the shaft main body 2 and an inner peripheral face 7B of the thrust holding member 7.

The ring-like hydraulic dynamic bearing 1 is constituted as described above and accordingly, when the shaft portion 4 carries out rotational motion relative to the bearing portion 5, the lubricant held between the shaft portion 4 and the bearing portion 5 is pressurized at the very small clearances between the shaft portion 4 and the bearing portion 5 by the radial dynamic pressure generating grooves GR and the axial dynamic pressure generating grooves G1 and G2, thereby, the radial dynamic pressure portion and the axial dynamic pressure portions, described above, are formed contiguously to each other between the shaft portion 4 and the bearing portion 5.

In this case, the ring-like space 8 is formed at the ring-like hydraulic dynamic bearing 1 and the lubricant is filled there and accordingly, the lubricant drawn toward the center of the outer peripheral portion 3A by the radial dynamic pressure generating grooves GR and the lubricant drawn toward the center of the plane portion 3B of the ring 3 by the axial dynamic pressure generating grooves GA1, are supplied by the lubricant in the ring-like space 8 without causing negative pressure at contiguous portions of the two dynamic pressure generating portions. Therefore, there is produced no mutual interference between the radial dynamic pressure portion formed by the radial dynamic pressure generating grooves GR and the axial dynamic pressure portion formed by the axial dynamic pressure generating grooves GA1, no air bubbles are produced in the lubricant and accordingly, excellent dynamic pressure property is achieved and high bearing rigidity can be realized.

Similarly, owing to the lubricant filled in the ring-like space 9, the lubricant drawn toward the center of the outer peripheral portion 3A of the ring 3 by the radial dynamic pressure generating grooves GR and the lubricant drawn toward the center of the plane portion 3C of the ring 3 by the axial dynamic pressure generating grooves GA2, are supplied by the lubricant in the ring-like space 9 without producing negative pressure at contiguous portions of the two dynamic pressure generating portions. Therefore, mutual interference is not produced between the radial dynamic portion formed by the radial dynamic pressure generating grooves GR and the axial dynamic pressure portion formed by the axial dynamic pressure generating grooves GA2 and no air bubbles are produced in the lubricant. As a result, the dynamic pressure function is significantly improved, high bearing rigidity is achieved and accordingly, stable rotation can be realized.

Figure 3:
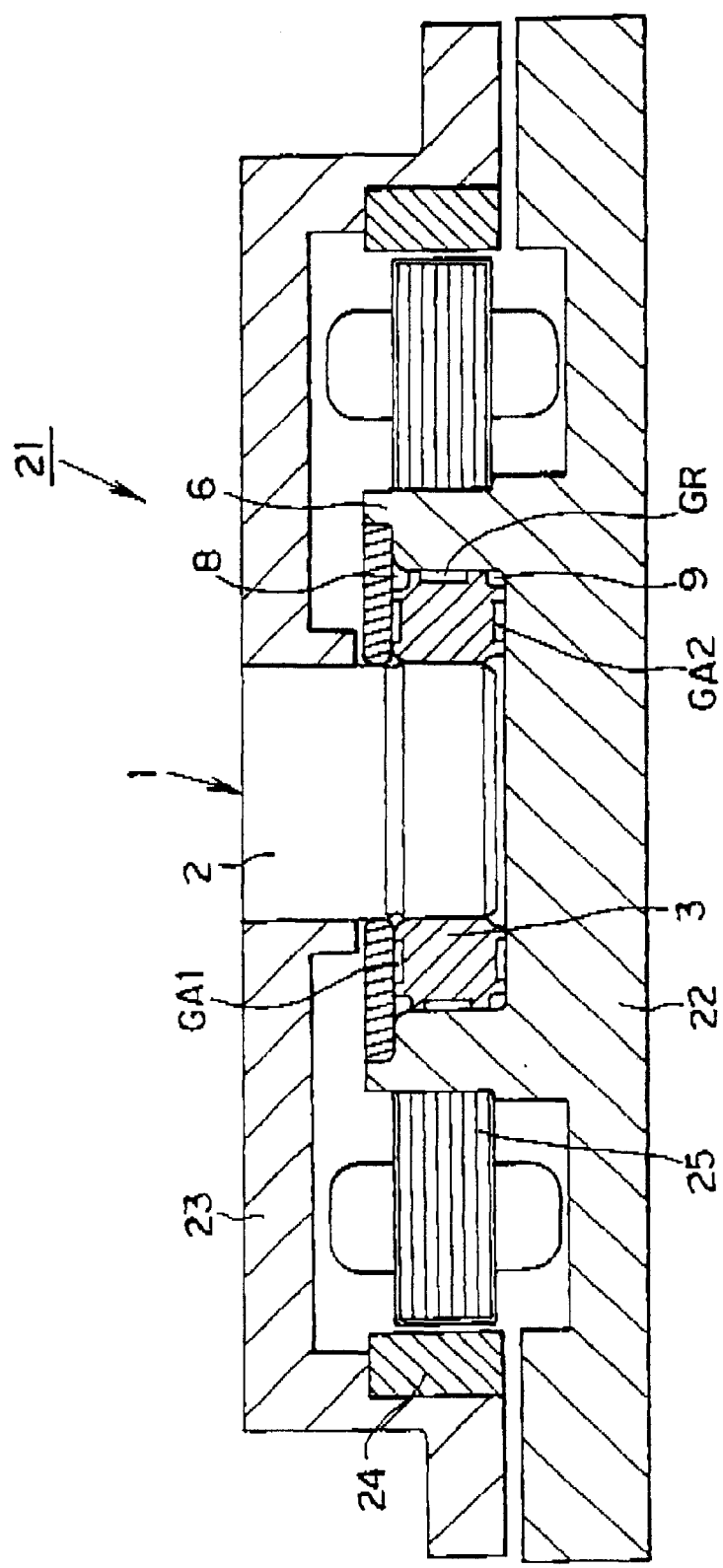
FIG. 3 is a sectional view showing an example of an embodiment of a spindle motor constituted by using the ring-like hydraulic dynamic bearing shown in FIG. 1.

FIG. 3 is a sectional view showing an example of an embodiment of a spindle motor constituted by using the ring-like hydraulic dynamic bearing 1 shown by FIG. 1. According to a spindle motor 21, a base 22 is integrally assembled with the ring-like hydraulic dynamic bearing 1 shown by FIG. 1. That is, the bearing portion main body 6 of the ring-like hydraulic dynamic bearing 1 is formed integrally with the base 22. A hub 23 is fixed to the shaft main body 2 of the ring-like hydraulic dynamic bearing 1 and a rotor magnet 24 attached to the hub 23 and a stator coil 25 attached to the base 22 are opposed to each other via a very small clearance.

The spindle motor 21 is constituted as described above and accordingly, when current is made to flow in the stator coil 25, the hub 23 rotatably supported by the ring-like dynamic bearing 1 can be rotated. In this case, since the ring-like hydraulic dynamic bearing 1 is constituted as described above, the dynamic pressure function is excellent and the axial rigidity is excellent and accordingly, the hub 23 can stably be rotated. Therefore, when a magnetic disk is attached to the hub 23 by publicly-known pertinent means, the magnetic disk can be rotated extremely stably and magnetic recording and reading can be carried out at an extremely high density.

Figure 4:
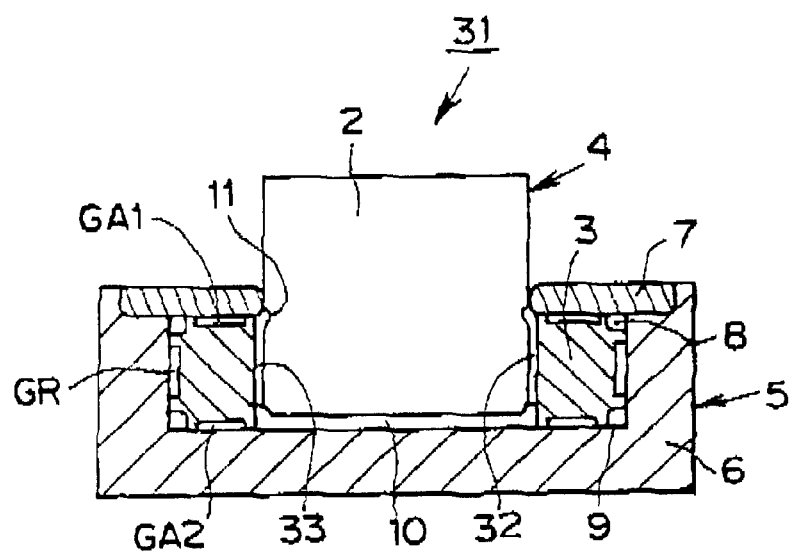
FIG. 4 is a sectional view showing another embodiment of a ring-like hydraulic dynamic bearing portion according to the invention.

FIG. 4 is a sectional view showing another embodiment of a ring-like hydraulic dynamic bearing portion according to the invention. Although the ring-like hydraulic dynamic bearing portion 31 is basically provided with a constitution similar to that of the ring-like hydraulic dynamic bearing 1 shown by FIG. 1, the ring-like hydraulic dynamic bearing portion 31 differs from the ring-like hydraulic dynamic bearing 1 shown by FIG. 1 only in that paths 32 and 33 for communicating the very small space 10 and the oil storage space 11 are provided at the inner peripheral face of the ring 3. Therefore, among respective portions of the ring-like hydraulic dynamic bearing 31, portions thereof in correspondence with the respective portions of the ring-like hydraulic dynamic bearing 1 are attached with the same notations and an explanation thereof will be omitted.

Figure 5:
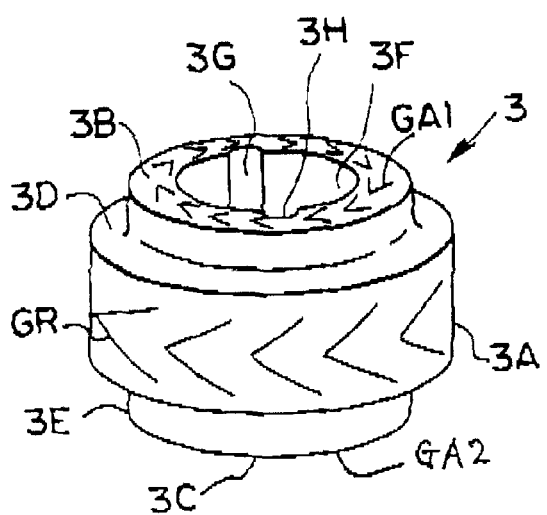
FIG. 5 is a perspective view enlarging a ring shown in FIG. 4.
Figure 6:
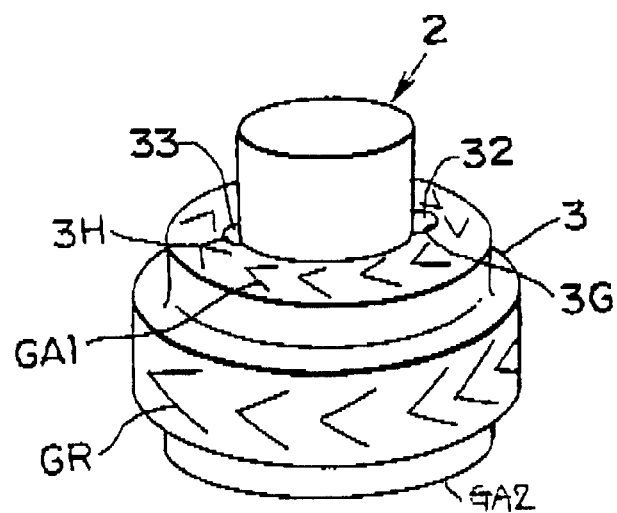
FIG 6 is perspective view enlarging a shaft portion shown in FIG. 4.

In reference to FIG. 5 and FIG. 6, in order to form the paths 32 and 33, vertical grooves 3G and 3H are formed at the inner peripheral face 3F of the ring 3 and accordingly, when the shaft main body 2 is fitted to the ring 3, the paths 32 and 33 are formed between the ring 3 and the shaft main body 2 by the vertical grooves 3G and 3H.

By providing the paths 32 and 33, when the lubricant in the very small space 10 is drawn to between the plane portion 3C of the ring 3 and the bottom face 6A$b$ of the recess portion 6A by dynamic pressure produced by the axial dynamic pressure generating grooves GA2, the inside of the very small space 10 can be prevented from being brought under negative pressure. As a result, the dynamic pressure function of the axial dynamic pressure portion formed by the axial dynamic pressure generating grooves GA2 can be promoted and the axial rigidity of the ring-like hydraulic dynamic bearing 31 can further be promoted.

Figure 7:
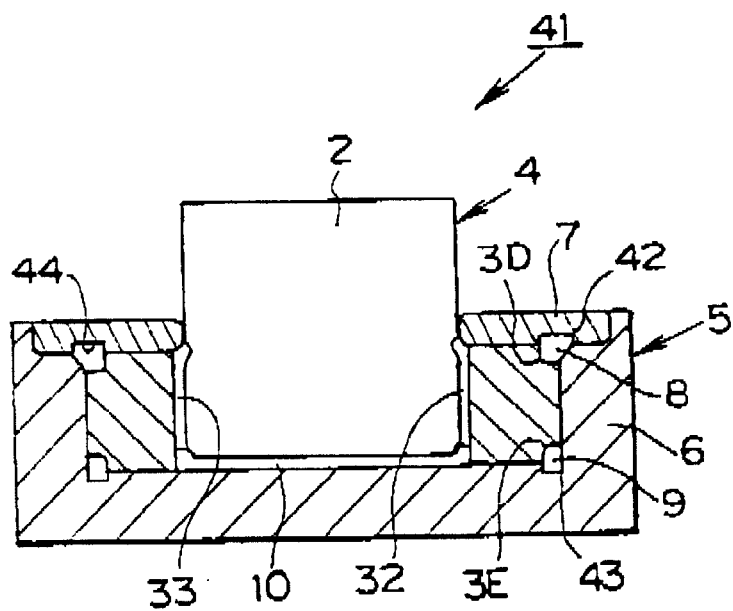
FIG 7 is a sectional view showing a modified example of a ring-like hydraulic dynamic bearing shown in FIG. 4.
Figure 8:
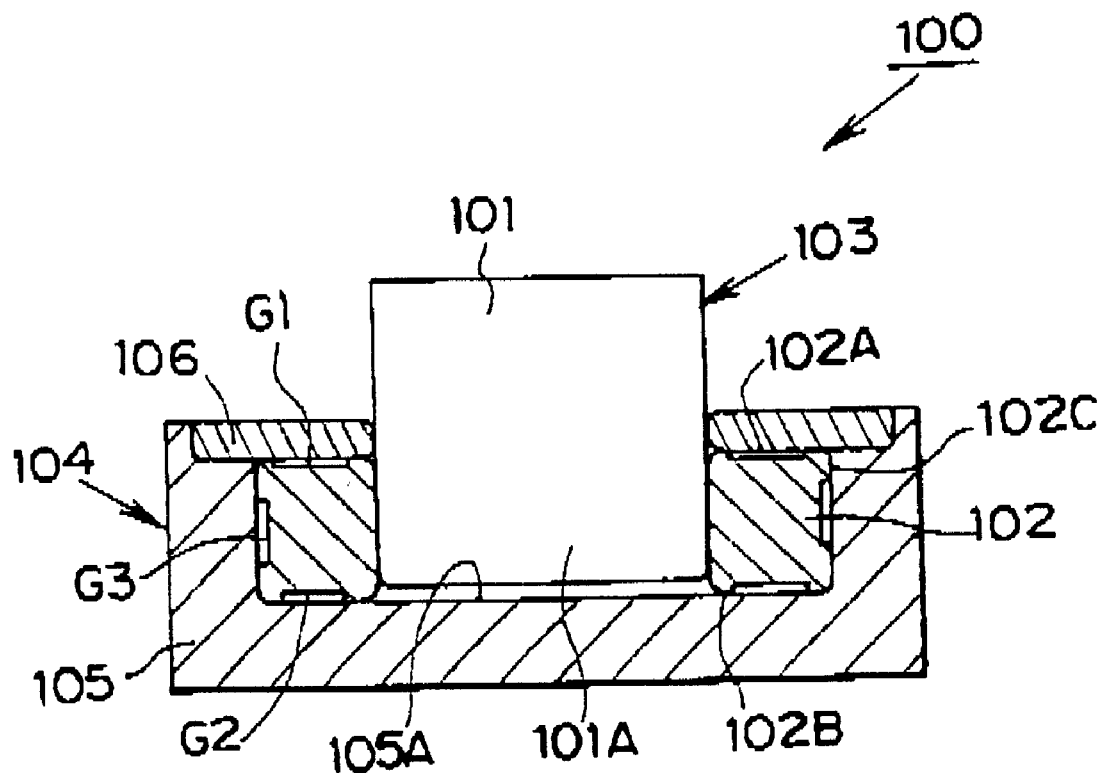
FIG. 8 is a sectional view showing a conventional ring-like hydraulic dynamic bearing.

FIG. 7 shows a modified example of the ring-like hydraulic dynamic bearing 31 shown by FIG. 4. According to the ring-like hydraulic dynamic bearing 41, by providing a ring-like groove 42 opposed to the ring-like stepped portion 3D on the side of the bearing portion 5 and providing a ring-like groove 44 opposed to the ring-like stepped portion 3D on the side of the thrust holding member 7 in the circular disk shape, enlargement of a capacity of the ring-like space 8 is achieved and further, a ring-like groove 43 opposed to the ring-like stepped portion 3E is provided on the side of the bearing portion 5 to thereby achieve enlargement of a capacity of the ring-like space 9. In this way, by achieving enlargement of the capacities of the ring-like spaces 8 and 9, the mutual interference between the radial dynamic pressure portion and the axial dynamic pressure portions contiguous thereto can further be reduced. As a result, the axial rigidity of the ring-like hydraulic dynamic bearing 41 can be promoted in comparison with that of the ring-like hydraulic dynamic bearing 31. Further, when the capacities may stay to be the same, dimensions of the ring-like stepped portions 3D and 3E are reduced and areas of the plane portions 3B and 3C are increased to thereby serve to generate larger dynamic pressure.

The ring-like hydraulic dynamic bearing 31 or 41 shown by FIG. 4 or FIG. 7 can be used in place of the ring-like hydraulic dynamic bearing 1 of the spindle motor 21 shown by FIG. 3 and similar effects can be achieved.

According to the invention, in the ring-like hydraulic dynamic bearing, there are provided the spaces for storing the lubricant at portions of the axial dynamic bearing portions and the radial dynamic bearing portion contiguous to each other and accordingly, mutual interference between the two dynamic pressure bearing portions can effectively be prevented, air bubbles are not produced in the lubricant in the contiguous regions, the axial rigidity can be promoted more than that in the conventional bearing and the hydraulic dynamic bearing having high function can be provided.

Further, since the very small spaces formed by the shaft main body and the bearing portion are communicated with the atmosphere by using circulation paths, the dynamic pressure properties of the dynamic pressure generating portions communicated with the very small spaces can significantly be improved.

Further, by constituting a spindle motor by using the hydraulic dynamic bearing, stable rotation is achieved and a spindle motor having higher function can be realized.

what is claimed is:

1. A hydraulic dynamic bearing comprising: a shaft assembly having a shaft main body and a ring member connected to an end portion of the shaft main body a bearing assembly for rotatable supporting the shaft assembly; a radial dynamic pressure bearing portion and a plurality of axial dynamic pressure bearing portions disposed contiguously to each other between the ring member of the shaft assembly and the bearing assembly for generating radial dynamic pressure and axial dynamic pressure respectively; and a plurality of spaces disposed along portions of the radial dynamic pressure bearing portion and the axial dynamic pressure bearing portions for storing a lubricant to generate dynamic pressure during rotation of the shaft assembly.

2. A hydraulic dynamic bearing according to claim 1; wherein the ring member has a plurality of stepped portions.

3. A spindle motor having a hydraulic dynamic bearing according to claim 2.

4. In a spindle motor having a base and a storage medium, a hydraulic dynamic bearing according to claim 2 for rotationally supporting the storage medium relative to the base. disposed at corner portions of the ring member, the stepped portions defining portions of the spaces.

5. A hydraulic dynamic bearing according to claim 1; wherein the axial dynamic pressure bearing portions comprise a plurality of axial dynamic pressure generating grooves formed in the ring member, and wherein the radial dynamic bearing portion comprises a plurality of radial dynamic pressure generating grooves formed in the ring member.

6. A spindle motor having a hydraulic dynamic bearing according to claim 5.

7. In a spindle motor having a base and a storage medium, a hydraulic dynamic bearing according to claim 5 for rotationally supporting the storage medium relative to the base.

8. A hydraulic dynamic bearing according to claim 1; wherein an end face of the shaft main body is disposed opposite to and spaced apart from a portion of the bearing assembly to define a clearance therebetween; and further comprising a plurality of paths formed in an inner peripheral surface of the ring member for communicating the clearance with the atmosphere to thereby enable circulation of lubricant during rotation of the shaft assembly.

9. A spindle motor having a hydraulic dynamic bearing according to claim 8.

10. In a spindle motor having a base and a storage medium, a hydraulic dynamic bearing according to claim 8 for rotationally supporting the storage medium relative to the base.

11. A hydraulic dynamic bearing according to claim 1; wherein the bearing assembly comprises a bearing main body and a holding member connected to the main body.

12. A hydraulic dynamic bearing according to claim 11; further comprising first and second stepped portions formed in the ring member.

13. A hydraulic dynamic bearing according to claim 12; wherein the plurality of spaces comprise a first space formed by the first stepped portion, a lower surface portion of the holding member and a first inner surface portion of the bearing main body, and a second space formed by the second stepped portion and a second inner surface portion of the bearing main body.

14. A hydraulic dynamic bearing according to claim 1; wherein the axial dynamic pressure portions comprise axial dynamic pressure generating grooves formed in upper and lower surface portions of the ring member for generating axial dynamic pressure during rotation of the shaft assembly; and wherein the radial dynamic pressure portion comprises a plurality of radial dynamic pressure generating grooves formed in an outer peripheral surface portion of the ring member for generating radial dynamic pressure during rotation of the shaft assembly.

15. A hydraulic dynamic bearing according to claim 14; wherein the bearing assembly comprises a bearing main body and a holding member connected to the main body.

16. A hydraulic dynamic bearing according to claim 15; wherein the upper surface portion of the ring member is disposed in confronting relation to a lower surface portion of the holding member, the lower surface portion of the ring member is disposed in confronting relation to a lower inner surface portion of the bearing main body, and the outer peripheral surface portion of the ring member is disposed in confronting relation to a side inner surface portion of the bearing main body.

17. A spindle motor having a hydraulic dynamic bearing according to claim 1.

18. In a spindle motor having a base and a storage medium, a hydraulic dynamic bearing according to claim 1 for rotationally supporting the storage medium relative to the base.

19. A hydraulic dynamic bearing comprising:
   a bearing member comprised of a bearing main body having a recess portion and a cover for covering an open end of the recess portion;
   a rotational assembly comprised of a shaft main body having an end portion extending into the recess of the bearing main body for undergoing rotation relative thereto and a ring; member disposed in the recess of the bearing main body and connected to the end portion of the shaft main body for rotation therewith;
   a plurality of axial dynamic pressure generating grooves formed in upper and lower surface portions of the ring member for generating axial dynamic pressure during rotation of the rotational assembly;
   a plurality of radial dynamic pressure generating grooves formed in an outer peripheral surface portion of the ring member for generating radial dynamic pressure during rotation of the rotational assembly; and
   means defining a plurality of spaces disposed between the bearing member and the rotational assembly for storing a lubricant.

20. A hydraulic dynamic bearing according to claim 19; wherein the ring member of the rotating assembly has a first stepped portion disposed between the upper surface portion and the outer peripheral surface portion, and a second stepped portion disposed between the lower surface portion and the outer peripheral surface portion.

21. A hydraulic dynamic bearing according to claim 20; wherein the means defining the plurality of spaces comprises the first stepped portion of the ring member which defines a first space together with a first surface portion of the bearing main body and a surface portion of the cover, and the second stepped portion of the ring member which defines a second space together with a second surface portion of the bearing main body.

22. A hydraulic dynamic bearing according to claim 21; wherein the lower surface portion of the ring member is disposed opposite to and spaced-apart from a base portion of the recess of the bearing main body to define a clearance therebetween; and further comprising a plurality of paths formed in an inner peripheral surface of the ring member for communicating the clearance with the atmosphere to thereby enable circulation of lubricant in the first and second spaces during rotation of the rotational assembly.

23. A spindle motor comprising: a rotor; a stator; and a hydraulic dynamic bearing as set forth in claim 19 for rotationally supporting the rotor relative to the stator.

24. A spindle motor according to claim 23; further comprising an object mounted on the rotor for rotation therewith.

25. A spindle motor according to claim 24; wherein the object comprises a storage medium.

\* \* \* \* \*